(12) United States Patent
Shinriki et al.

(10) Patent No.: US 7,856,155 B2
(45) Date of Patent: Dec. 21, 2010

(54) LIGHT MODULATOR AND ITS FABRICATION METHOD

(75) Inventors: Takashi Shinriki, Chiyoda-ku (JP); Katsutoshi Kondou, Chiyoda-ku (JP); Tsutomu Saitou, Chiyoda-ku (JP)

(73) Assignee: Sumitomo Osaka Cement Co., Ltd., Tokyo (JP)

( * ) Notice: Subject to any disclaimer, the term of this patent is extended or adjusted under 35 U.S.C. 154(b) by 24 days.

(21) Appl. No.: 11/992,866

(22) PCT Filed: Sep. 27, 2006

(86) PCT No.: PCT/JP2006/319107

§ 371 (c)(1),
(2), (4) Date: Nov. 21, 2008

(87) PCT Pub. No.: WO2007/040106

PCT Pub. Date: Apr. 12, 2007

(65) Prior Publication Data

US 2009/0129718 A1    May 21, 2009

(30) Foreign Application Priority Data

Sep. 30, 2005   (JP)   ............................. 2005-288276

(51) Int. Cl.
*G02F 1/035*       (2006.01)
*G02B 26/00*       (2006.01)
(52) U.S. Cl. ................ 385/2; 385/3; 385/14; 385/129; 385/130; 385/131; 359/238; 359/245; 359/251; 359/315
(58) Field of Classification Search ................ 359/238, 359/245, 251, 315; 385/2–3, 14, 129–131
See application file for complete search history.

(56) References Cited

U.S. PATENT DOCUMENTS

| | | | | |
|---|---|---|---|---|
| 3,801,418 A | * | 4/1974 | Cornelis et al. | ............... 428/38 |
| 4,039,249 A | * | 8/1977 | Kaminow et al. | ............. 385/14 |
| 5,138,480 A | * | 8/1992 | Dolfi et al. | ................... 359/251 |
| 5,189,547 A | * | 2/1993 | Day et al. | ................... 359/245 |

(Continued)

FOREIGN PATENT DOCUMENTS

EP    1 657 588 A1    5/2006

(Continued)

*Primary Examiner*—Brian M. Healy
*Assistant Examiner*—Guy G Anderson
(74) *Attorney, Agent, or Firm*—Chapman and Cutler LLP

(57) ABSTRACT

It is an object of the invention to provide a light modulator using a thin plate having a thickness of 20 μm or less and capable of stably holding a conductive film suppressing troubles such as resonance phenomenon of microwaves in a substrate and pyro-electric phenomenon and to provide a method of fabricating the light modulator. The light modulator includes: a thin plate (10) formed of a material having an electro-optic effect and having a thickness of 20 μm or less; a light waveguide (11) formed on the front or rear surface of the thin plate; and modulation electrodes (13, 14) formed on the front surface of the thin plate to modulate light passing through the light waveguide. The light modulator further includes a reinforcing plate (16) bonded to the rear surface of the thin plate and a conductive film (17) continuously formed in the range from the side surface of the thin plate to the side surface of the reinforcing plate.

4 Claims, 3 Drawing Sheets

U.S. PATENT DOCUMENTS

| | | | |
|---|---|---|---|
| 5,416,859 A * | 5/1995 | Burns et al. | 385/3 |
| 6,069,729 A * | 5/2000 | Gill et al. | 359/245 |
| 6,356,673 B1 * | 3/2002 | Burns | 385/2 |
| 6,400,494 B1 * | 6/2002 | Kondo et al. | 359/322 |
| 6,958,852 B2 * | 10/2005 | Aoki et al. | 359/315 |
| 7,177,075 B2 * | 2/2007 | Simpson et al. | 359/359 |
| 7,256,920 B2 * | 8/2007 | Tinoco | 359/238 |
| 7,373,034 B2 * | 5/2008 | Shimizu et al. | 385/14 |
| 2003/0044100 A1 | 3/2003 | Kondo et al. | |
| 2007/0147722 A1 * | 6/2007 | Kondo et al. | 385/2 |

FOREIGN PATENT DOCUMENTS

| | | |
|---|---|---|
| JP | 5-509415 A | 12/1993 |
| JP | 2919132 B2 | 7/1999 |
| JP | 2002-182173 A | 6/2002 |
| JP | 2003-156723 A | 5/2003 |
| JP | 2004-245991 A | 9/2004 |
| WO | WO 91/17470 A1 | 11/1991 |
| WO | WO 2005/019913 A1 | 3/2005 |

* cited by examiner

[FIG. 1]
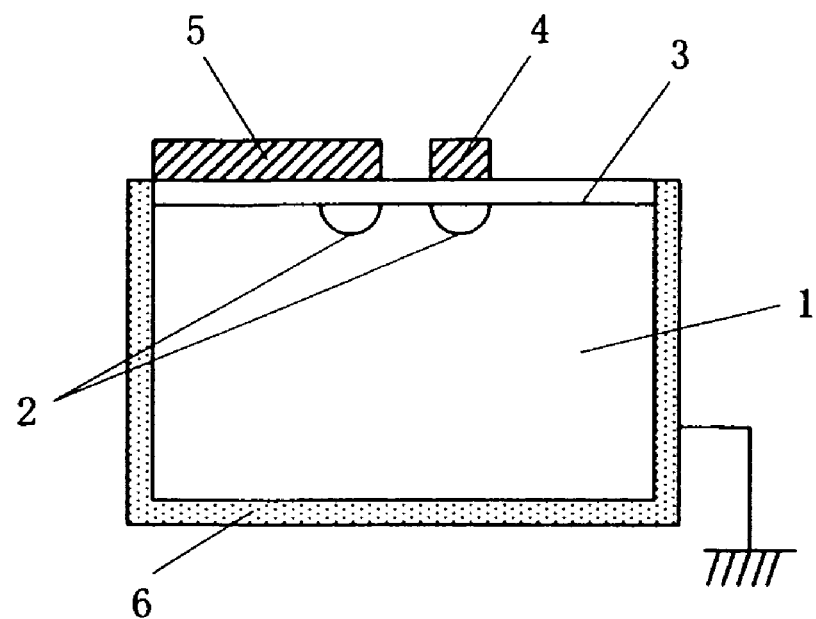
[FIG. 2]
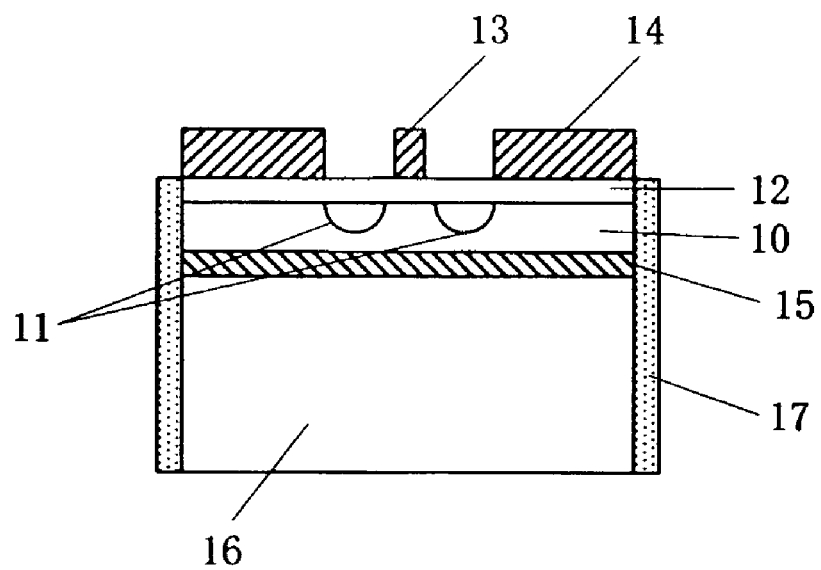

[FIG. 3]
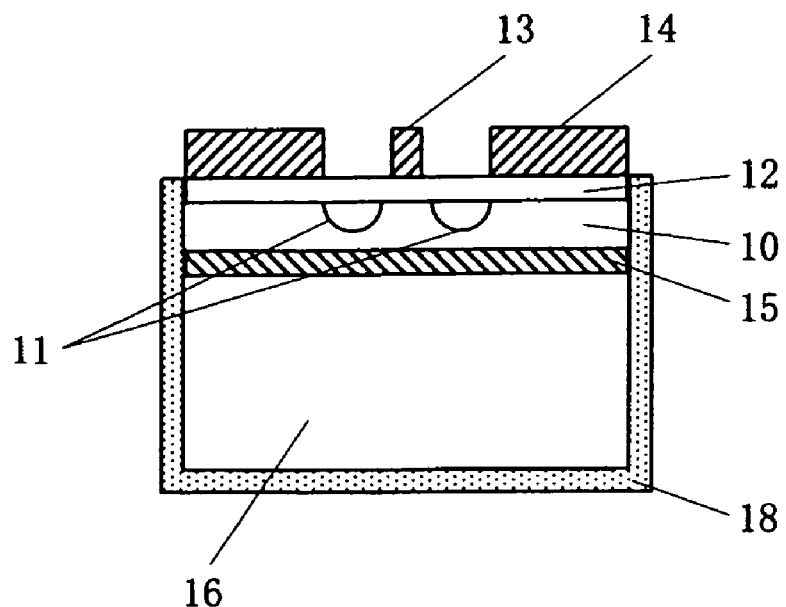
[FIG. 4]
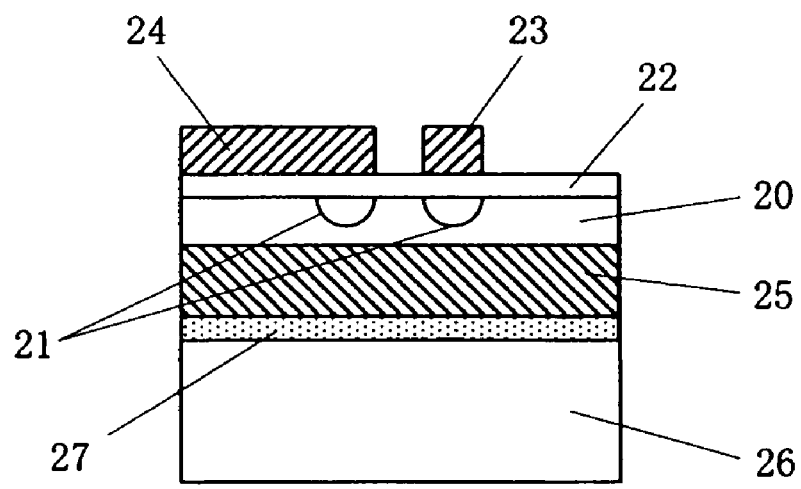

[FIG. 5]
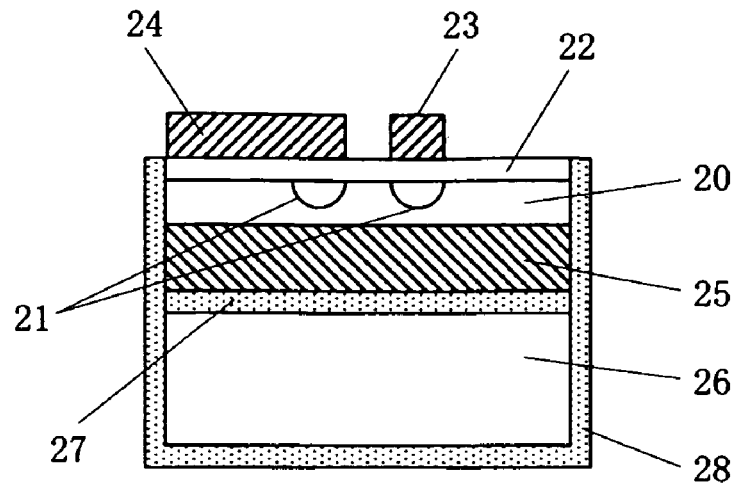
[FIG. 6]
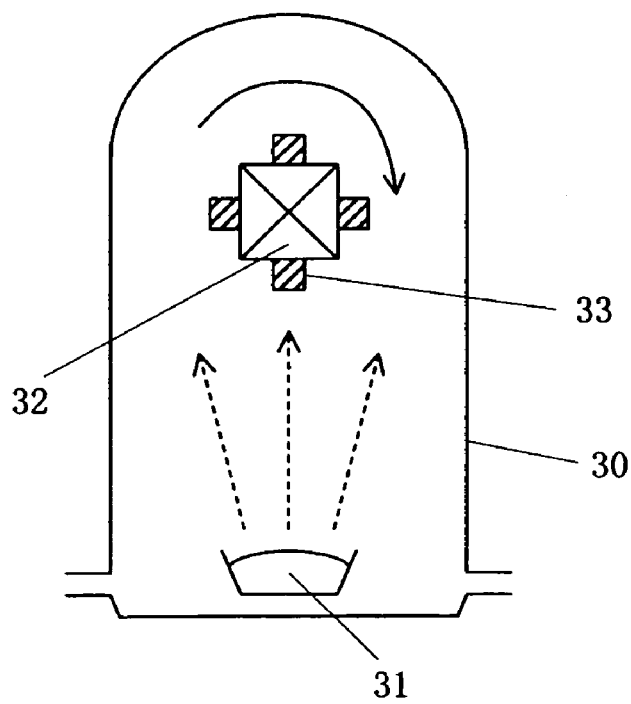

LIGHT MODULATOR AND ITS FABRICATION METHOD

TECHNICAL FIELD

The present invention relates to a light modulator that includes a thin plate formed of a material having an electro-optic effect and having a thickness of 20 μm or less and a reinforcing plate bonded to the rear surface of the thin plate and having a larger thickness than the thin plate.

BACKGROUND ART

Conventionally, in optical communication and optical measurement fields, there has been broadly used a waveguide modulator in which a light waveguide and modulation electrodes are formed on a substrate having electro-optic effect. In a light modulator using a substrate having electro-optic effect as described in Patent Document 1 or 2, there has been a method of suppressing occurrence of resonance phenomenon in which microwaves applied to the light modulator resonates in the substrate and occurrence of pyro-electric phenomenon in the substrate by forming a conductive film shown in FIG. 1 on the side surface and the rear surface of the substrate so as to be grounded. In addition, it is possible to improve electric characteristics (S11, S21) and suppress bias jump and the like. S11 is defined as reflection characteristics of electric signals that can be obtained by measuring a reflection amount at the time when an outer terminal gives the input signals to a signal electrode. S21 is defined as transmission characteristics of electric signals that can be obtained by measuring a transmission amount of output signals with respect to the input signals inputted from the outer terminal to the signal electrode. Generally, dip phenomenon can be checked in the transmission characteristics (S21). In addition, in case of X plate, the bias jump is phenomenon where electric charges are generated on the substrate by pyro-electric phenomenon, and the electric charges have an adverse effect on the electrodes formed on the substrate. In addition, FIG. 1 is a sectional view illustrating a light modulator. The reference numeral 1 represents the substrate, the reference numeral 2 represents the light waveguide, the reference numeral 3 represents a buffer layer, the reference numeral 4 represents a signal electrode, the reference numeral 5 represents an earth electrode, and the reference numeral 6 represents the conductive film. Hereinafter, the signal electrode 4 and the earth electrode 5 are referred to as modulation electrodes.

Patent Document 1 PCT Japanese Translation Patent Publication No. H5-509415

Patent Document 2 Japanese Examined Patent Application Publication No. 2919132

Meanwhile, to implement the light modulator having broadband, there has been a method that the substrate is formed with a thickness of several tens of μm thinner than the known thickness of 500 μm so as to satisfy velocity matching condition between microwaves and light waves and reduce a drive voltage. For example, in the following Patent Document 3 or 4, there is a method that a light waveguide and modulation electrodes are formed on a thin substrate having a thickness of 30 μm or less, the thin substrate is bonded to the other substrate having low permittivity, velocity matching between microwaves and light waves is performed by lowering effective refractive index thereof with respect to the microwaves, and mechanical strength thereof is maintained.

Patent Document 3: Japanese Unexamined Patent Application Publication No. S64-18121

Patent Document 4: Japanese Unexamined Patent Application Publication No. 2003-215519

However, when the above-described conductive film is formed on the substrate that is formed so as to have a very small thickness (hereinafter, it is referred to as 'thin plate'), an area of the side surface of the thin plate excessively decreases since the thickness of the substrate is thin. Thus, there has been a problem that adhesive strength between the substrate and the conductive film is weak and the conductive film is easily exfoliated from the substrate. In addition, when the substrate is formed thin, optical confinement in the light waveguide deteriorates, and thus a phenomenon where a light distribution pattern of the light waves is spread in a thickness direction of the thin plate or a transverse direction (which is a direction perpendicular to the thickness direction of the thin plate). When the conductive film is formed on the rear surface of the substrate, there has been a problem that the light waves are scattered or absorbed by the conductive film.

DISCLOSURE OF THE INVENTION

Problems that the Invention is to Solve

The invention has been made in consideration of the above-mentioned problems, and it is an object is to provide a light modulator using a thin plate having a thickness of 20 μm or less and capable of stably holding a conductive film suppressing troubles such as resonance phenomenon of microwaves in a substrate and pyro-electric phenomenon. It is also an object to provide a method of fabricating the light modulator.

Means for Solving the Problems

To solve the above-described problems, in a first aspect of the invention, the light modulator includes: a thin plate formed of a material having an electro-optic effect and having a thickness of 20 μm or less; a light waveguide formed on the front or rear surface of the thin plate; and modulation electrodes formed on the front surface of the thin plate to modulate light passing through the light waveguide. The light modulator further includes a reinforcing plate bonded to the rear surface of the thin plate and a conductive film continuously formed in the range from the side surface of the thin plate to the side surface of the reinforcing plate. The bonding between the rear surface of the thin plate and the reinforcing plate may be performed by using an adhesive or may be directly performed. When an adhesive layer is formed by the adhesive, the conductive film is continuously formed in the range from the side surface of the thin plate to the side surface of the reinforcing plate through the adhesive layer interposed therebetween.

In a second aspect of the invention, the light modulator described above is configured so that the conductive film is further formed on the rear surface of the reinforcing plate.

In a third aspect of the invention, a light modulator includes: a thin plate formed of a material having an electro-optic effect and having a thickness of 20 μm or less; a light waveguide formed on the front surface or the rear surface of the thin plate; and modulation electrodes formed on the front surface of the thin plate to modulate light passing through the light waveguide. The light modulator further includes a reinforcing plate bonded to the rear surface of the thin plate by an adhesion layer interposed therebetween, and a conductive film formed between the adhesion layer and the reinforcing plate.

In a fourth aspect of the invention, the light modulator described in the preceding paragraph is configured so that the conductive film is continuously formed in the range from the side surface of the thin plate to the side surface of the reinforcing plate.

In a fifth aspect of the invention, the light modulator described in any of the first through fourth aspects described above is configured so that the conductive film is formed of material including at least one of Au, Ti, and Si.

In a sixth aspect of the invention, a light modulator includes: a thin plate formed of a material having an electro-optic effect and having a thickness of 20 μm or less; a light waveguide formed on the front surface or the rear surface of the thin plate; and modulation electrodes formed on the front surface of the thin plate to modulate light passing through the light waveguide. The method of the light modulator includes the steps of: bonding a reinforcing plate to the rear surface of the thin plate; covering at least the front surface of the thin plate and the side surface of the thin plate, on which an exit portion and an incident portion of the light waveguide is formed, with a passivation film; forming a conductive film on an exposed portion of the thin plate and the reinforcing plate that are not covered with the passivation film, after the covering step; and removing the passivation film after the conductive film forming step.

ADVANTAGE OF THE INVENTION

According to a first aspect of the invention, the light modulator includes: a thin plate formed of a material having an electro-optic effect and having a thickness of 20 μm or less; a light waveguide formed on the front or rear surface of the thin plate; and modulation electrodes formed on the front surface of the thin plate to modulate light passing through the light waveguide. The light modulator further includes a reinforcing plate bonded to the rear surface of the thin plate and a conductive film continuously formed in the range from the side surface of the thin plate to the side surface of the reinforcing plate. Thus, the conductive film formation area is increased by bonding the conductive film to the reinforcing plate so as to increase adhesive strength between the conductive film and the thin plate. Therefore, it is possible to effectively suppress exfoliation of the conductive film from the thin plate.

According to a second aspect of the invention, the conductive film is further formed on the rear surface of the reinforcing plate. Thus, the conductive films formed on the side surfaces of the thin plate are electrically connected to each other through the conductive film formed on the rear surface. Therefore, it is possible to effectively suppress pyro-electric phenomenon or resonance phenomenon of microwaves in the substrate. In addition, it is possible to simplify a grounding operation of the conductive films by electrically connecting the conductive films to each other.

According to a third aspect of the invention, a light modulator includes: a thin plate formed of a material having an electro-optic effect and having a thickness of 20 μm or less; a light waveguide formed on the front surface or the rear surface of the thin plate; and modulation electrodes formed on the front surface of the thin plate to modulate light passing through the light waveguide. The light modulator further includes a reinforcing plate bonded to the rear surface of the thin plate by an adhesion layer interposed therebetween, and a conductive film formed between the adhesion layer and the reinforcing plate. Thus, the conductive film can be disposed on the rear surface of the thin plate, and so it is possible to effectively suppress pyro-electric phenomenon that occurs in a thickness direction of the thin plate. Further, since the conductive film is disposed away from the rear surface of the thin plate, light waves passing through the light waveguide is not scattered and absorbed. In addition, when a dielectric substance is used in the reinforcing plate, it is possible to also suppress pyro-electric phenomenon in the reinforcing plate.

According to a fourth aspect of the invention disclosed in addition to the conductive film formed between the adhesion layer and the reinforcing plate, the conductive film is continuously formed in the range from the side surface of the thin plate to the side surface of the reinforcing plate. Thus, both of the conductive films are electrically connected to each other. Therefore, it is possible to also simplify a grounding operation of the conductive film and additionally suppress resonance phenomenon of the microwaves in the substrate.

According to a fifth aspect of the invention disclosed in the conductive film is formed of material including at least one of Au, Ti, and Si. Thus, it is possible to secure conductivity sufficient to suppress pyro-electric phenomenon or resonance phenomenon of microwaves in the substrate and to increase adhesive strength of the conductive film with respect to the reinforcing plate or the substrate.

According to a sixth aspect of the invention disclosed in a thin plate formed of a material having an electro-optic effect and having a thickness of 20 μm or less; a light waveguide formed on the front surface or the rear surface of the thin plate; and modulation electrodes formed on the front surface of the thin plate to modulate light passing through the light waveguide. The method of the light modulator includes the steps of: bonding a reinforcing plate to the rear surface of the thin plate; covering at least the front surface of the thin plate and the side surface of the thin plate, on which an exit portion and an incident portion of the light waveguide is formed, with a passivation film; forming a conductive film on an exposed portion of the thin plate and the reinforcing plate that are not covered with the passivation film, after the covering step; and removing the passivation film after the conductive film forming step. Thus, it is possible to continuously form the conductive film in the range from the side surface of the thin plate to the side surface of the reinforcing plate. In addition, it is also possible to increase unity in the conductive film as a whole since the conductive film can be continuously formed on the rear surface of the reinforcing plate together with the conductive film formed on the side surface of the reinforcing plate or the thin plate at the same time.

BRIEF DESCRIPTION OF THE DRAWINGS

FIG. 1 is a cross-sectional view of the known light modulator.

FIG. 2 is a view of a light modulator according to a first embodiment of the invention.

FIG. 3 is a view of a light modulator according to an application example of the first embodiment in the invention.

FIG. 4 is a view of a light modulator according to a second embodiment of the invention.

FIG. 5 is a view of a light modulator according to an application example of the second embodiment in the invention.

FIG. 6 is a view of a vacuum deposition method used as a method of manufacturing the light modulator according to the invention.

DESCRIPTION OF REFERENCE NUMERALS AND SIGNS

1, 10, 20: SUBSTRATE
2, 11, 21: LIGHT WAVEGUIDE
3, 12, 22: BUFFER LAYER
4, 13, 23: SIGNAL ELECTRODE 5, 14, 24: EARTH ELECTRODE
6, 17, 18, 27, 28: CONDUCTIVE FILM
15, 25: ADHESION LAYER
16, 26: REINFORCING PLATE
30: VACUUM CHAMBER
31: DEPOSITION MATERIAL
32: TARGET HOLDER
33: LIGHT MODULATOR CHIP

BEST MODE FOR CARRYING OUT THE INVENTION

Hereinafter, the invention will be described in detail with reference to suitable examples. FIG. 2 is a cross-sectional view of a light modulator according to a first embodiment of the invention. The light modulator includes: a thin plate 10 formed of a material having an electro-optic effect and having a thickness of 20 μm or less; a light waveguide 11 (the light waveguide may be formed on the rear surface of the thin plate 10) formed on the front or rear surface of the thin plate; and modulation electrodes (a signal electrode 13, an earth electrode 14) formed on the front surface of the thin plate to modulate light passing through the light waveguide. The light modulator further includes a reinforcing plate 16 bonded to the rear surface of the thin plate via an adhesion layer 15 and a conductive film 17 continuously formed in the range from the side surface of the thin plate to the side surface of the reinforcing plate. With such a configuration, the conductive film formation area is increased by bonding the conductive film to the reinforcing plate so as to increase adhesive strength between the conductive film and the thin plate. Therefore, it is possible to effectively suppress exfoliation of the conductive film from the thin plate. In addition, the bonding between the rear surface of the thin plate and the reinforcing plate may be performed by the adhesion layer 15 using an adhesive interposed therebetween as shown in FIG. 2 or may be performed by a direct bonding.

In FIG. 2, an X-cut type substrate is used in the thin plate. In the X-cut type substrate, the conductive film 17 can effectively suppress polarized charges that are generated in the transverse direction of the substrate by pyro-electric phenomenon caused by temperature variance. In addition, the conductive film 17 can suppress an occurrence of resonance phenomenon where microwaves applied to the light modulator resonate in the substrate by absorbing the resonance.

FIG. 3 is an application example of the first embodiment, and a conductive film 18 is also formed on the rear surface of the reinforcing plate. With such a configuration, the conductive films formed on the side surfaces of the thin plate are electrically connected to each other through the conductive film formed on the rear surface. Therefore, it is possible to effectively suppress pyro-electric phenomenon or resonance phenomenon of microwaves in the substrate. In addition, it is possible to simplify a grounding operation of the conductive films by electrically connecting the conductive films to each other. For example, it is possible to ground the conductive films as a whole through the conductive film formed on the rear surface of the reinforcing plate even by using a method that the light modulator body is disposed in a conductive casing.

The light waveguide 11 can be formed by a method such as a thermal diffusion method or a proton exchange method of diffusing Ti and the like on the surface of the substrate. In addition, as described in Patent Document 5, the light waveguide also can be formed by a method of forming ridges on the surface of the thin plate 10 in accordance with the light waveguide shape. The modulation electrodes such as the signal electrode 13 and the earth electrode 14 can be formed by a method of forming electrodes patterns of Ti—Au, a gold plating method, and the like. In addition, it is also possible to dispose a buffer layer 12 such as a dielectric substance $SiO_2$ on the substrate surface where the light waveguide is formed and form the modulation electrodes on the buffer layer if necessary.

Patent Document 5: Japanese Unexamined Patent Application Publication No. H6-289341

As for a material having electro-optic effect, it is possible to use, for example, a lithium niobate, a lithium tantalate, a PLZT (lead lanthanum zirconate titanate), a quartz based material, and a combination of them. Particularly, crystal of the lithium niobate (LN) having high electro-optic effect is appropriately used.

In a fabrication method of the thin plate including light modulating elements the above-described light waveguide is formed on the substrate having a thickness of several hundreds of μm, and the rear surface of the substrate is polished, thereby forming the thin plate that has a thickness of 20 μm or less. Then, the modulation electrodes are formed on the surface of the thin plate. In addition, it is possible to polish the rear surface of the substrate after the light waveguide or the modulation electrodes are formed. Further, there is a risk where the thin plate is damaged by a thermal shock at the time of forming the light waveguide or a mechanical shock caused by handling the thin plate at the time of performing various processes. In such a process that is easily affected by the thermal or mechanical shock, it is preferred that various processes should be previously performed before the substrate is polished to form a thin plate.

As for a material used in the reinforcing plate, it is possible to use various materials. For example, other than the same material used in the thin plate, it is possible to use materials of the reinforcing plate having lower permittivity than the thin plate such as a quartz, a glass, and an alumina or materials having crystal orientation different from the thin plate as described in Patent Document 5. However, it is preferred to select a material of the reinforcing plate having the coefficient of linear expansion equal to the thin plate in order to stabilize modulation characteristics of the light modulator with respect to temperature variance. When it is difficult to select the material of the reinforcing plate having the coefficient of linear expansion equal to the thin plate, material of the adhesive for bonding the thin plate to the reinforcing plate is selected from the materials having the coefficient of linear expansion equal to the thin plate as described in Patent Document 4.

As for a material of the adhesion layer 15 bonding between the thin plate 10 and the reinforcing plate 16, it is possible to use various adhesive materials such as an epoxy based adhesive, a thermosetting adhesive, a UV curable adhesive, a solder grass, and a photo-curable or photosetting resin adhesive.

As for a material of the conductive film, it is possible to use Si, and it is also possible to use Au or Ti like the material of the modulation electrodes. There is no limitation for the material of the conductive film when the material thereof has a degree of permittivity enough to suppress pyro-electric phenomenon or resonance phenomenon of the microwaves.

Next, a method of fabricating the conductive film of the light modulator shown in FIG. 2 or 3 will be described.

(1) Process of forming Modulating Element by Using Thin Plate

As described above, the light waveguide is formed on the substrate, the substrate is formed in a thin plate shape by polishing the substrate, and the modulation electrodes are additionally formed on the surface of the thin plate. If necessary, the modulation electrodes are formed after the light waveguide is formed, and then the polishing operation may be performed in order to make a thin plate.

(2) Process of Bonding Reinforcing Plate

The reinforcing plate is bonded to the rear surface of the thin plate where the light modulating element is formed through the adhesion layer interposed therebetween. However, it is also possible to form the light waveguide on the rear surface of the substrate, bond the reinforcing plate to the rear surface of the substrate, and polish the surface of the substrate by using the reinforcing plate as a substrate holder at the time of the polishing operation. In this case, the modulation electrodes are formed on the thin plate surface after the polishing operation is finished. Since the light modulator is formed by using a normal wafer substrate, after the reinforcing plate is bonded to the thin plate, the wafer is cut into chips (hereinafter, it is referred to as 'a light modulator chip') corresponding to each light modulating element.

(3) Process of Coating Passivation Film

In outer surfaces of the light modulator chip, at least the thin plate surface having the modulation electrodes formed thereon and the side surface of the thin plate having the exit and incident portions of the light waveguide formed thereon is coated with the passivation film. As for the passivation film, it is possible to use resist film.

(4) Process of Forming Conductive Film

After the coating process, the conductive film is formed on an exposed portion (the side surface or the rear surface) of the reinforcing plate or the side surface of the thin plate that is not coated with the passivation film. The conductive film is formed by appropriately using a vacuum deposition method. As shown in FIG. 6, a conductive film formation material 31 and a light modulator chip 33 held by a target holder 32 is placed in a vacuum chamber 30, air in the vacuum chamber is pumped out, and the conductive film formation material is vaporized while the target holder 32 is rotated as the arrow shown in the drawing. By rotating the target holder 32, it is possible to form the conductive film for a plurality of chips, simultaneously, and perform uniform deposition even on the side surfaces of the chips.

(5) Process of Removing Passivation Film

After the process of forming the conductive film, the resist film serving as the passivation film is removed by a solvent. In this manner, the conductive film is uniformly formed on the outer surface of the light modulator chip that is not protected by the passivation film.

Next, a light modulator according to a second embodiment of the invention will be described. FIG. 4 is a cross-sectional view of the light modulator according to the second embodiment of the invention. In the second embodiment. The light modulator includes: a thin plate 20 formed of a material having an electro-optic effect and having a thickness of 20 μm or less; a light waveguide 21 formed on the front or rear surface of the thin plate; and modulation electrodes (a signal electrode 23, an earth electrode 24) formed on the front surface of the thin plate to modulate light passing through the light waveguide. The light modulator further includes a reinforcing plate 26 bonded to the rear surface of the thin plate 20 via an adhesion layer 25 and a conductive film 27 formed between the adhesion layer 25 and the reinforcing plate 26. In addition, the buffer layer is represented by the reference numeral 22.

The thin plate 20 is a Z-cut type substrate. The conductive film 27 is disposed on the rear surface of the thin plate. Therefore, it is possible to effectively suppress pyro-electric phenomenon that occurs in a thickness direction of the thin plate. In addition, when a dielectric substance is used in the reinforcing plate, it is possible to also suppress influence of pyro-electric phenomenon on the reinforcing plate. Further, since the conductive film is disposed away from the rear surface of the thin plate, light waves passing through the light waveguide is not scattered and absorbed. A thickness of the adhesion layer is varied in accordance with the permittivity of the adhesive. However, it is preferred to set the thickness thereof so that the light waves passing through the light waveguide are not scattered and absorbed.

FIG. 5 is an application example of the second embodiment. In addition to the conductive film 27, the conductive film 28 is continuously formed in the range from the side surface of the thin plate to the side surface of the reinforcing plate, if necessary, to the rear surface of the reinforcing plate. With such a configuration, the operation of grounding the conductive film 27 can be performed by connecting with the conductive film 28. Thus, it is possible to also simplify a grounding operation of the conductive film. In addition, it is also possible to suppress resonance phenomenon of the microwaves in the substrate.

As for a method of forming the conductive film 27 of the light modulator shown in FIG. 4 or 5, the following method can be used.

(1) Method of fixing Conductive Film on Thin Plate and Reinforcing Plate by using Adhesive The surface of the reinforcing plate is coated with an adhesive, a conductive layer (a thin film or a thin layer) is formed thereon, and the conductive layer is coated with the other adhesive, thereby bonding the thin plate thereto.

(2) Method of forming Conductive Film on Surface of Reinforcing Plate

The conductive film is formed on the surface of the reinforcing plate by a vacuum deposition method or a gold plating method. In addition, it is possible to bond the reinforcing plate to the thin plate by coating the surface of the conductive adhesive or the rear surface of the thin plate with non-conductive adhesive, after the surface of the reinforcing plate is coated with a conductive adhesive. In addition, it is possible to reform the surface of reinforcing plate so as to have conductivity and employ the reformed portion as a conductive film.

In the method of forming the conductive film around the light modulator chip as shown in FIG. 5, it is possible to employ the same method as described in the method of fabricating the conductive film of the light modulator shown in FIG. 2 or 3.

INDUSTRIAL APPLICABILITY

According to the invention as described above, it is possible to provide a light modulator using a thin plate having a thickness of 20 μm or less and capable of stably holding a conductive film suppressing troubles such as resonance phenomenon of microwaves in a substrate and pyro-electric phenomenon. It is also possible to provide a method of fabricating the light modulator.

The invention claimed is:

1. A light modulator, comprising:
   a thin plate formed of a material having an electro-optic effect and having a thickness of 20 μm or less,
   a light waveguide formed on a front surface or a rear surface of the thin plate,
   modulation electrodes formed on the front surface of the thin plate to modulate light passing through the light waveguide, a reinforcing plate bonded to the rear surface of the thin plate, and a conductive film made of material comprising at least one Au, Ti, and Si continuously formed in a range from a side surface of the thin plate to a side surface of the reinforcing plate by using a vacuum deposition method.

2. The light modulator according to claim 1, wherein the conductive film is further formed on a rear surface of the reinforcing plate.

3. The light modulator according to claim 1, wherein the reinforcing plate is bonded to the rear surface of the thin plate by an adhesion layer interposed therebetween, and a second conductive film is formed between the adhesion layer and the reinforcing plate.

4. A method of fabricating a light modulator that includes a thin plate formed of a material having an electro-optic effect and having a thickness of 20 μm or less, a light waveguide formed on a front surface or a rear surface of the thin plate, and modulation electrodes formed on the front surface of the thin plate to modulate light passing through the light waveguide, comprising the steps of:

bonding a reinforcing plate to the rear surface of the thin plate;

covering at least the front surface of the thin plate and a side surface of the thin plate, on which an exit portion and an incident portion of the light waveguide is formed, with a passivation film;

forming a conductive film made of material comprising at least one of Au, Ti, and Si on an exposed portion of the thin plate and the reinforcing plate that are not covered with the passivation film, by using a vacuum deposition method, after the covering step; and removing the passivation film after the conductive film forming step.

* * * * *